(12) United States Patent  
Larsson

(10) Patent No.: US 6,273,926 B1  
(45) Date of Patent: Aug. 14, 2001

(54) CLEANROOM FILTER UNIT

(75) Inventor: Bertil Larsson, Tyresö (SE)

(73) Assignee: ABB Flakt AB, Stockholm (SE)

( * ) Notice: Subject to any disclaimer, the term of this patent is extended or adjusted under 35 U.S.C. 154(b) by 0 days.

(21) Appl. No.: 09/462,426

(22) PCT Filed: Jul. 9, 1998

(86) PCT No.: PCT/SE98/01357

§ 371 Date: Jan. 10, 2000

§ 102(e) Date: Jan. 10, 2000

(87) PCT Pub. No.: WO99/02927

PCT Pub. Date: Jan. 21, 1999

(30) Foreign Application Priority Data

Jul. 11, 1997 (SE) .................................................. 9702638

(51) Int. Cl.[7] .................................................. B01D 46/52
(52) U.S. Cl. .......................... 55/385.2; 55/355; 55/483; 55/497; 55/502; 55/511; 55/DIG. 31
(58) Field of Search ................... 55/355, 385.2, 55/502, 483, 484, 511, DIG. 31, 497

(56) References Cited

U.S. PATENT DOCUMENTS

| | | | |
|---|---|---|---|
| 3,870,490 | * 3/1975 | Landy | 55/355 |
| 4,555,255 | 11/1985 | Kissel . | |
| 4,724,749 | * 2/1988 | Hedrick | 55/355 |
| 4,819,549 | * 4/1989 | Gillingham et al. | 55/355 |
| 4,883,513 | * 11/1989 | Monson et al. | 55/355 |
| 4,986,050 | * 1/1991 | Brunetti et al. | 55/355 |
| 5,540,028 | * 7/1996 | Scott et al. | 55/355 |
| 5,620,369 | * 4/1997 | Sparnsy et al. | 55/355 |
| 5,961,702 | * 10/1999 | Doneit | 55/355 |
| 5,993,311 | * 11/1999 | Feller et al. | 55/355 |
| 6,117,202 | * 9/2000 | Wetzel | 55/355 |

FOREIGN PATENT DOCUMENTS

| | | |
|---|---|---|
| 0 190 109 | 8/1986 | (EP) . |
| 0 783 092 | 7/1997 | (EP) . |
| 0 798 027 | 10/1997 | (EP) . |

* cited by examiner

Primary Examiner—David A. Simmons  
Assistant Examiner—Minh-Chau T. Pham  
(74) Attorney, Agent, or Firm—Young & Thompson

(57) ABSTRACT

A filter unit for airtight attachment to a framework of a cleanroom ceiling includes a filter, a circumferential wall surrounding the filter, and a downwardly projecting sealing knife to be received in a sealant containing groove formed in said framework. The sealing knife includes vertical weldable wall elements interconnected by welding and mounted on the circumferential wall by airtight mounting means.

3 Claims, 1 Drawing Sheet

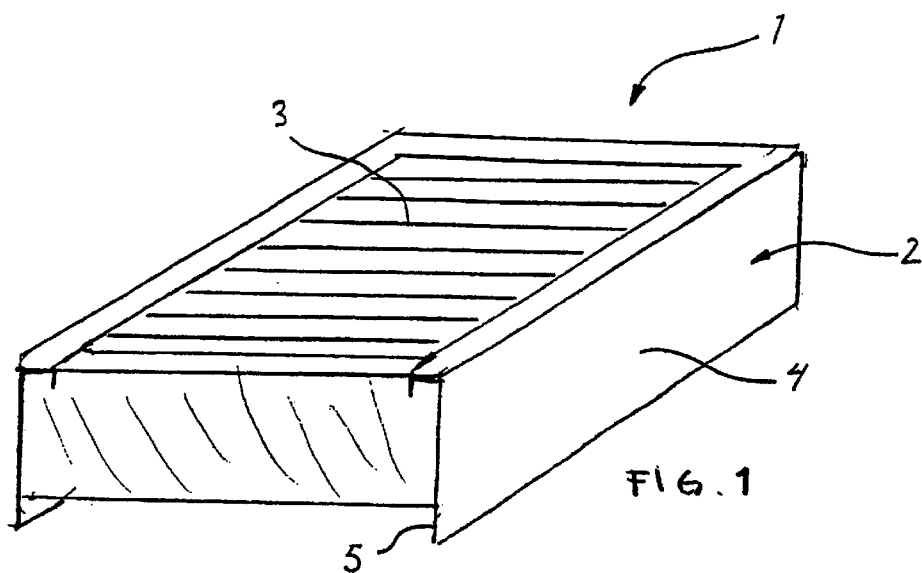
FIG. 1
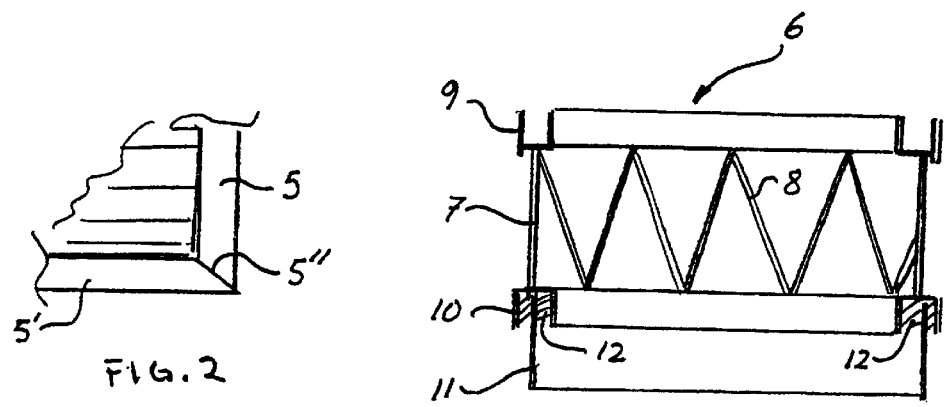
FIG. 2
FIG. 3
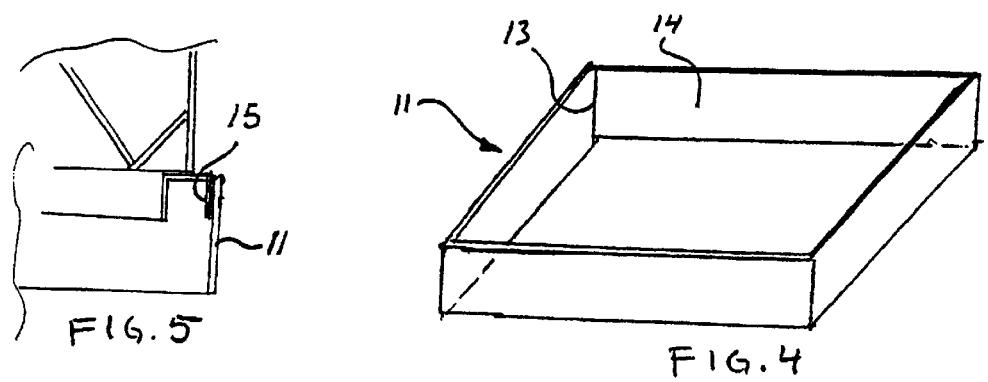
FIG. 5
FIG. 4

CLEANROOM FILTER UNIT

CROSS REFERENCE TO RELATED APPLICATIONS

This is the 35 USC 371 national stage of international application PCT/SE98/01357 filed on Jul. 9, 1998, which designated the United States of America.

FIELD OF THE INVENTION

The present invention relates to a cleanroom filter unit for airtight attachment to a framework of a cleanroom ceiling, comprising a filter, a vertical circumferential wall surrounding the filter and having a lower edge, and a sealing knife projecting downwardly from the lower edge of the circumferential wall to be received in a sealant containing groove formed in the framework of the cleanroom ceiling.

DESCRIPTION OF THE RELATED ART

In prior cleanroom applications air is generally supplied through so called HEPA-filters arranged in the framework of the cleanroom ceiling. In this connection it is essential that no leakage occurs between the filter and the framework.

Traditional filter units are fabricated by gluing together separate straight wall portions to form the circumferential wall surrounding the filter so that the final filter unit takes the shape of a rectangular box with glued corner joints. The sealing knife comprises vertical extensions of said straight wall portions. Due to the fact that the sealant knife extends downwards into the sealant, i.e. vaseline, in the groove formed in the framework of the cleanroom ceiling a reliable sealing between the filter unit and said framework is achieved in a simple and very efficient manner.

A problem of this known design, however, is that the glued corner joints are not reliable. The fact is that at a rough estimate up to 25% of all corners joints of filter units in use are not completely airtight. Since the gluing surface is so small, normally the thickness of the wall elements of the circumferential wall is about 1.5 mm, very strong demands on the gluing accuracy have to be made. Furthermore, the above described assemblage of a filter unit demands a great deal of work to carry out. To weld the separate wall elements together in order to provide leakproof corner joints is not a good solution to the problem described above, because the heat generated during the welding operation would damage the heat sensitive filter, which is composed of glued fibreglass paper.

SUMMARY OF THE INVENTION

The object of the present invention is to provide a filter unit for cleanroom ceilings, which is reliably tight and has a simple design that enables an inexpensive production of the filter unit.

This object is achieved by the kind of filter unit initially defined, which is characterized in that the sealing knife includes vertical weldable wall elements interconnected by welding and mounted on the circumferential wall by airtight mounting means. As a result the sealing knife of the filter unit has reliable airtight corner joints.

According to a preferred embodiment of the invention the airtight mounting means comprises a profiled frame connected to the lower edge of the circumferential wall and forming a downwards open U-shaped channel into which the vertical wall elements of the sealing knife extend, and moulding mass moulded in said U-shaped channel to secure the sealing knife to said profiled frame.

According to an alternative embodiment of the invention the airtight mounting means comprises a flange connected to the lower edge of the circumferential wall and extending downwards therefrom. The wall elements of the sealing knife vertically overlap said flange and is bonded thereto by gluing.

BRIEF DESCRIPTION OF THE DRAWINGS

The invention will be described in more detail in the following description with reference to the accompanying drawing, in which FIG. 1 schematically shows a HEPA-filter unit according to prior art, with one side partly cut off, FIG. 2 shows a part view of a corner of an underside of a conventional HEPA-filter on an enlarged scale, FIG. 3 shows a schematic cross-sectional view of a filter unit according to the invention, FIG. 4 shows a sealing knife which is a component of the filter unit according to the invention, and FIG. 5 schematically shows an alternative embodiment of a filter unit according to the invention.

DESCRIPTION OF PREFERRED EMBODIMENTS

In FIG. 1 there is shown a schematic perspective view of a known HEPA-filter unit 1 with a wall 2 surrounding a filter 3. The wall 2 comprises smooth aluminum wall portions 4 with downwardly directed wall extensions forming a sealing knife 5.

As shown in FIG. 2 adjacent wall extensions 5, 5' of the sealing knife are glued together to achieve airtightness. The lateral extension of the glue surface 5" where the adjacent wall extensions 5,5' abut each other will be in the order of 1.5 mm, while the height of the sealant knife may amount to at least 50 mm. As a consequence, the risk of leakage will be considerable and therefore this design is not suitable for use in cleanroom facilities having strict demands of cleanliness.

In FIG. 3 there is shown a cross-sectional view of a filter unit 6 according to a preferred embodiment of the invention. The filter unit 6 comprises a circumferential wall composed of four vertical interconnected wall portions 7 taking the shape of a rectangular box, in which the filter 8 in the form of fibreglass paper is arranged. A sealing knife 11, which is separately shown in FIG. 4, comprises four separate vertical smooth wall elements 14 of aluminum, which are interconnected by welding. The sealing knife 11 is mounted on the wall portions 7 by airtight mounting means comprising a profiled frame 10, preferably of aluminum, attached to the lower edges of the wall portions 7. There is also a similar profiled frame 9 attached to the upper edges of the wall portions 7. The lower profiled frame 10 forms a downwards open encircling U-shaped channel into which the wall elements 14 of the sealing knife extend. Said mounting means further comprises moulding mass 12 moulded in the U-shaped channel of the profiled frame 10 to secure the sealing knife 11 to the profiled frame 10. The operation to mould the sealing knife 11 to the profiled frame 10 is simple and rapid and fulfils demands made for reliable sealing.

According to an alternative embodiment of the invention as shown in FIG. 5, the airtight mounting means comprises a flange 15 connected to the lower edges of the wall portions 7 and extending downwards therefrom. The wall elements 14 of the sealing knife 11 are sized to permit them to vertically overlap the flange 15 and the sealing knife 11 is airtightly bonded thereto by gluing. Also this method results in a reliable airtightness, but the assemblage of the filter unit will be somewhat more complicated.

In application of a filter unit according to the invention, the filter unit is placed on the framework of the cleanroom ceiling with the sealing knife fitting in one of the grooves of the framework containing a suitable sealant such as vaseline. As a result a satisfactory sealing can be immediately achieved as the sealing knife enters the sealant.

What is claimed is:

1. A cleanroom filter unit for airtight attachment to a framework of a cleanroom ceiling, comprising a filter, a vertical circumferential wall surrounding said filter, and a sealing knife projecting downwardly from said circumferential wall to be received in a sealant containing groove formed in the framework of the clean room ceiling, said sealing knife being separately produced from vertical weldable wall elements, which are welded together, said separate sealing knife being mounted on said circumferential wall by airtight mounting means.

2. A filter unit according to claim 1, wherein said airtight mounting means comprises a profiled frame connected to said circumferential wall and forming a downwards open U-shaped channel into which said vertical wall elements of said sealing knife extend, and moulding mass moulded in said U-shaped channel to secure said sealing knife to said profiled frame.

3. A filter unit according to claim 1, wherein said airtight mounting means comprises a flange connected to said circumferential wall and extending downwards therefrom, said vertical wall elements of said sealing knife vertically overlapping said flange and being bonded thereto by gluing.

* * * * *